US010033772B2

(12) United States Patent
Sherlock et al.

(10) Patent No.: US 10,033,772 B2
(45) Date of Patent: Jul. 24, 2018

(54) COLLABORATIVE PROJECT MANAGEMENT

(71) Applicant: Disney Enterprises, Inc., Burbank, CA (US)

(72) Inventors: Brendan P. Sherlock, Glendale, CA (US); Mangesh Pimpalkar, Los Angeles, CA (US); Nathan Bowers, Valley Village, CA (US); Maged Boctor, La Mirada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 156 days.

(21) Appl. No.: 14/852,364

(22) Filed: Sep. 11, 2015

(65) Prior Publication Data

US 2017/0078342 A1    Mar. 16, 2017

(51) Int. Cl.
*H04L 29/06* (2006.01)
*H04L 29/08* (2006.01)
*H04L 12/18* (2006.01)

(52) U.S. Cl.
CPC ...... *H04L 65/4015* (2013.01); *H04L 12/1822* (2013.01); *H04L 67/1095* (2013.01)

(58) Field of Classification Search
CPC ............. H04L 12/1822; H04L 65/4015; H04L 67/1095
See application file for complete search history.

(56) References Cited

U.S. PATENT DOCUMENTS

| | | | |
|---|---|---|---|
| 2009/0210459 A1* | 8/2009 | Nair | G06F 17/2288 |
| 2012/0084542 A1* | 4/2012 | Reeves | G06F 13/14 |
| | | | 713/1 |
| 2013/0155071 A1* | 6/2013 | Chan | G06T 13/00 |
| | | | 345/473 |
| 2015/0199315 A1* | 7/2015 | Grieve | G06F 17/212 |
| | | | 715/753 |

* cited by examiner

*Primary Examiner* — Arvin Eskandarnia
*Assistant Examiner* — Gil H. Lee
(74) *Attorney, Agent, or Firm* — Farjami & Farjami LLP

(57) ABSTRACT

There are provided collaborative project management systems and method. Such a system includes a hardware processor, and a system memory having stored therein a collaboration module including a master project application corresponding to a collaborative project, a visual effects application, and a multi-user collaborator application. The hardware processor is configured to execute the collaboration module to process a change data corresponding to an update to the collaborative project, assign control of the master project application to the visual effects application, transform the change data into a visual effect, and produce a modification to the master project application based on the visual effect. The hardware processor is also configured to execute the collaboration module to transfer control of the master project application to the multi-user collaborator application, and to provide a master change data for updating user applications utilized by respective remote users, based on the modification.

16 Claims, 3 Drawing Sheets

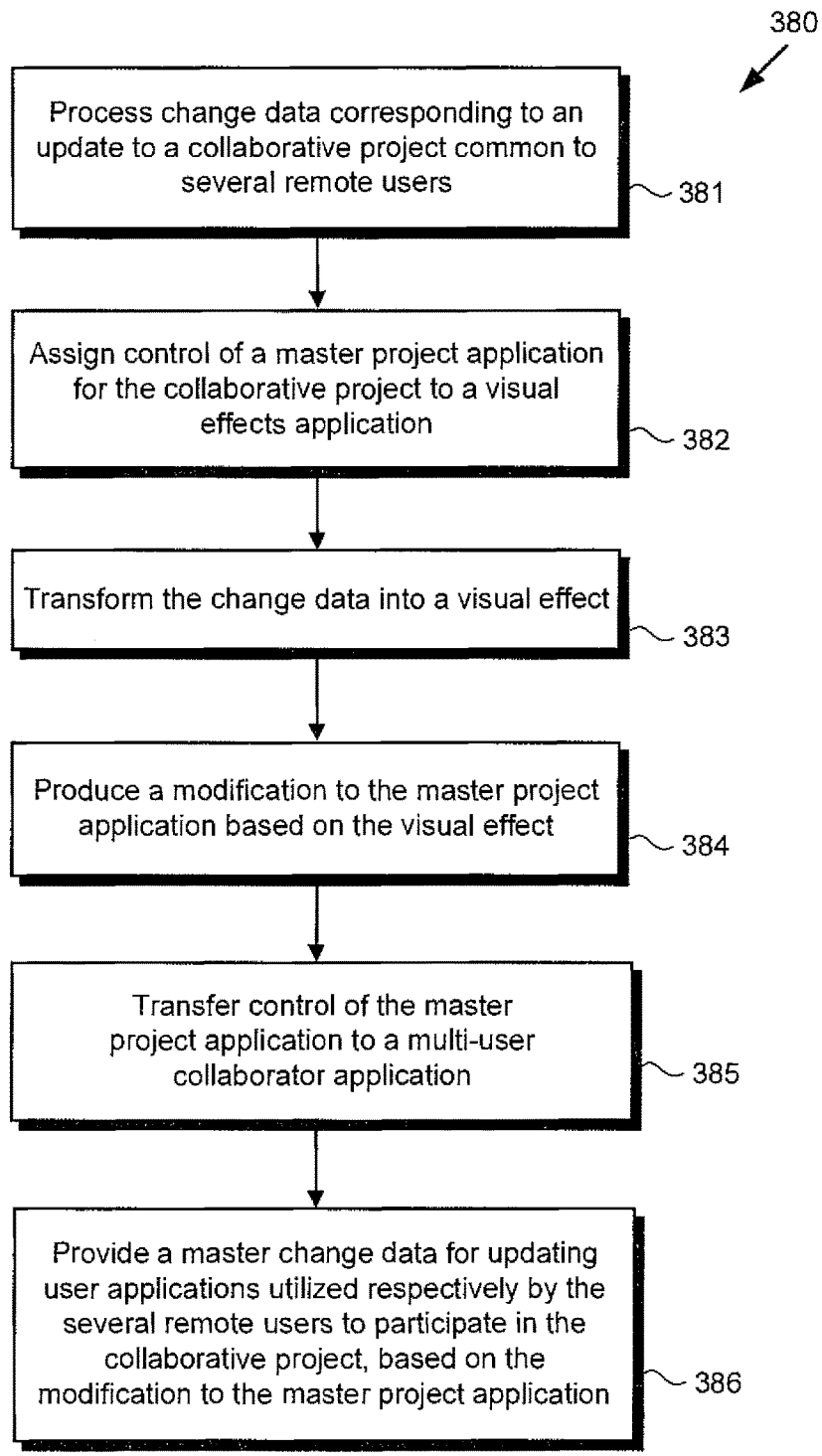

COLLABORATIVE PROJECT MANAGEMENT

BACKGROUND

The completion of time sensitive and highly complex projects increasingly requires contributions from a geographically dispersed team of experts having specialized knowledge and/or uniquely relevant experience. In addition, the relative success or failure of such projects may rely on marketplace or business changes that occur dynamically during work on the project and may not be known to the project team. Although tools for enabling collaboration exist, those conventional tools are typically optimized for a particular type of work product and are designed to passively process the inputs provided by individual collaborators. There remains a need for a solution enabling real-time multidisciplinary collaboration for the successful management of complex projects in a dynamically changing project environment.

SUMMARY

There are provided systems and methods for collaborative project management, substantially as shown in and/or described in connection with at least one of the figures, and as set forth more completely in the claims.

BRIEF DESCRIPTION OF THE DRAWINGS

FIG. 3 is a flowchart presenting an exemplary method for use by a collaborative project management system, according to one implementation of the present disclosure.

DETAILED DESCRIPTION

Figure 1:
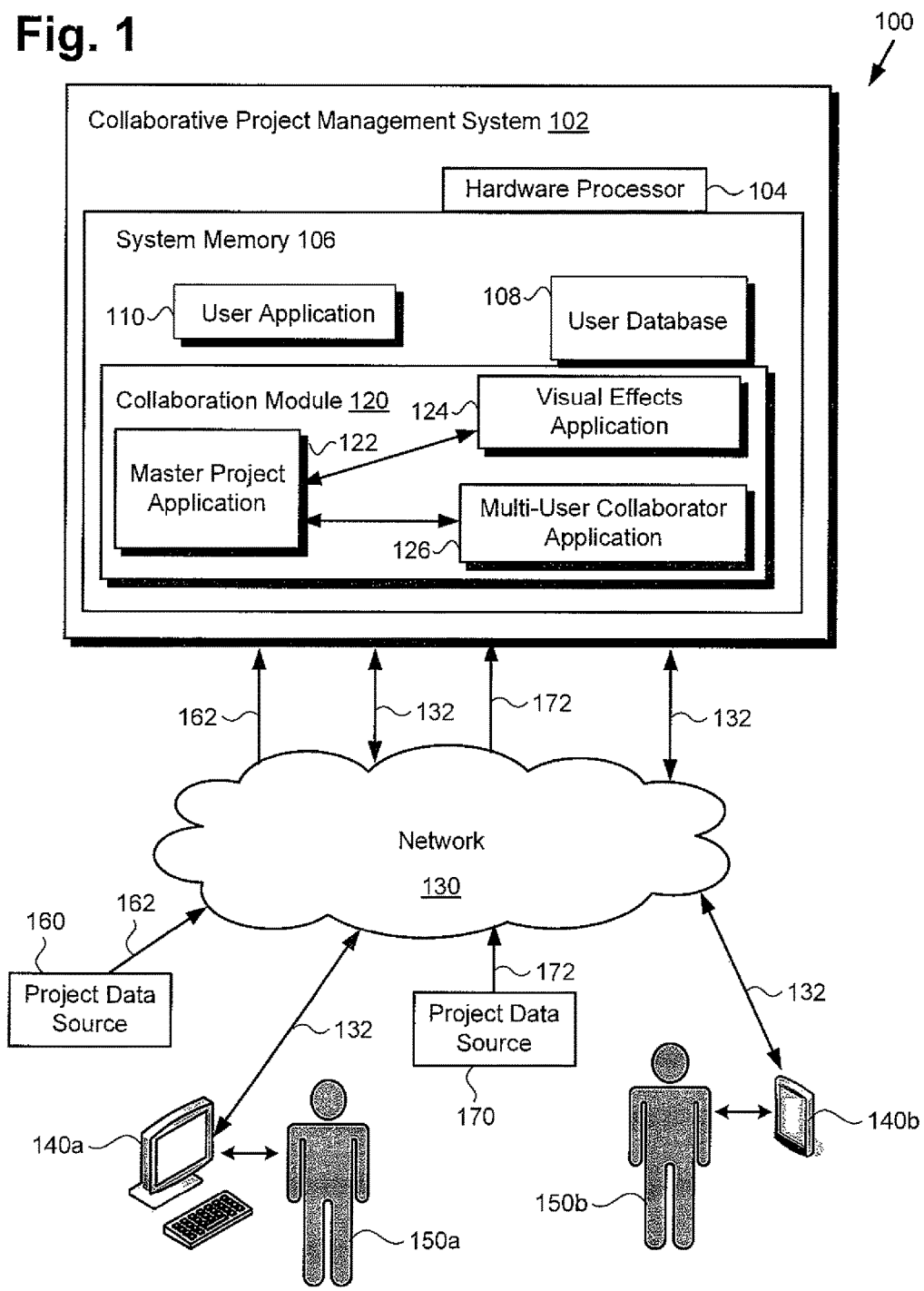
FIG. 1 shows a diagram of an exemplary collaborative project management system, according to one implementation of the present disclosure.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application addresses the challenges to collaboration described above, as well as analogous obstacles to successful project management, by providing collaborative project management systems and methods. According to one implementation, such a system and method may be used to assist producers and/or broadcasters of media content to substantially optimize a broadcast schedule. For example, such a system and method may be used to produce a broadcast schedule for the airing of television (TV) content that is substantially optimized to enhance ratings and/or to increase advertising sponsorship.

As disclosed in the present application, a collaborative project management system includes a collaboration module having a master project application corresponding to a collaborative project. The collaboration module also includes a visual effects application configured to transform change data for updating the collaborative project into a visual effect, such as an animation or other dynamic visual effect representative of the update, and to produce a modification to the master project application based on the visual effect. In addition, the collaboration module includes a multi-user collaborator application configured to provide a master change data for updating user applications utilized respectively by remote users collaborating on the collaborative project, based on the modification.

In some implementations, the collaboration module may be configured to generate the change data for updating the collaborative project automatically. For example, the collaboration module may be configured to receive and process project data corresponding to changes in market or business conditions from one or more project data sources other than the remote users collaborating on the collaborative project.

The collaborative project management enabled by the systems and according to the methods disclosed in the present application can be applied across a wide variety of project types, including highly complex interdisciplinary projects. For example, as stated above, in some implementations, the present solution may be used to produce a broadcast schedule for the airing of TV content that is substantially optimized to enhance ratings and/or to increase advertising sponsorship. Alternatively, the present solution may be implemented to schedule maintenance or upgrading of theme park attractions, such as rides or shows, for example. Moreover, in some implementations, the present solution may be used to schedule seasonal routing and relocation of cruise ships so as to substantially optimize passenger safety, comfort, and enjoyment. Management of the exemplary collaborative projects described above, as well as collaborative projects of many other types, can be enabled and enhanced through implementation of the systems and methods disclosed in the present application.

FIG. 1 shows a diagram of an exemplary collaborative project management system, according to one implementation. As shown in FIG. 1, collaborative project management system 102 is situated within collaboration environment 100 including communication network 130, client system 140a utilized by remote user 150a, client system 140b utilized by remote user 150b, first project data source 160, and second project data source 170.

Collaborative project management system 102 includes hardware processor 104, and system memory 106 storing collaboration module 120 including master project application 122, visual effects application 124, and multi-user collaborator application 126. In addition, system memory 106 is shown to include user database 108 and user application 110. Also shown in FIG. 1 are network communication links 132 interactively connecting client systems 140a and 140b with collaborative project management system 102 via communication network 130, as well as project data 162 and project data 172 received by collaborative project management system 102 via communication network 130.

According to the implementation shown in FIG. 1, remote users 150a and 150b may utilize respective client systems 140a and 140b to interact with collaborative project management system 102 over communication network 130, for example to download user application 110 to client systems 140a and 140b, and/or to access collaboration module 120 remotely. In one such implementation, collaborative project management system 102 may correspond to one or more web servers, accessible over a packet network such as the Internet, for example. Alternatively, collaborative project management system 102 may correspond to one or more servers supporting a local area network (LAN), or included in another type of limited distribution network.

It is noted that although FIG. 1 depicts user database 108, user application 110, and collaboration module 120 including master project application 122, visual effects application 124, and multi-user collaborator application 126 as being mutually co-located in system memory 106, that representation is merely provided as an aid to conceptual clarity. More generally, collaborative project management system 102 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within collaborative project management system 102. Thus, it is to be understood that any or all of user database 108, user application 110, collaboration module 120, master project application 122, visual effects application 124, and multi-user collaborator application 126 may be stored remotely from one another within the distributed memory resources of collaborative project management system 102.

It is further noted that although client systems 140a and 140b are shown, respectively, as a personal computer (PC) and a mobile communication device in FIG. 1, those representations are provided merely for exemplary purposes. In other implementations, client system 140a and/or client system 140b may be any type of user system configured for communication with collaborative project management system 102, such as a computer workstation, or a personal communication device such as a smartphone or tablet computer, for example.

Master project application 122 corresponds to a collaborative project on which remoter users 150a and 150b may be participating collaboratively. Hardware processor 104 is configured to execute collaboration module 120 to process a change data corresponding to an update to the collaborative project. Such a change data may be received over network communication links 132 based on updates to the collaborative project introduced by remote users 150a and/or 150b, for example. Alternatively, or in addition, such change data may be generated automatically by collaboration module 120 based on project data 162 and/or project data 172 received from respective first and second project data sources 160 and 170.

Hardware processor 104 is further configured to execute collaboration module 120 to assign temporary control of master project application 122 to visual effects application 124. Collaboration module 120, executed by hardware processor 104, can utilize visual effects application 124 to transform the change data into a visual effect, such as a dynamic visual effect in the form of an animation that represents the update to the collaborative project. Collaboration module 120, executed by hardware processor 104, can also utilize visual effects application 124 to produce a modification to master project application 122 temporarily controlled by visual effects application 124, based on the visual effect.

In addition, hardware processor 104 is configured to execute collaboration module 120 to transfer control of master project application 122 to multi-user collaborator application 126. Multi-user collaborator application 126 may then be used to provide a master change data for updating instantiations of user applications 110 utilized by respective remote users 150a and 150b to participate in the collaborative project, based on the modification. According to the implementation shown in FIG. 1, for example, such master change data can be provided to instantiations of user application 110 on respective client systems 140a and 140b over network communication links 132.

It is noted that, in some implementations, the master change data provided to the instantiations of user application 110 on respective client systems 140a and 140b may be provided to client systems 140a and 140b substantially concurrently. Moreover, in some implementations, the master change data may be provided to client systems 140a and 140b substantially in real-time relative to generation of the change data for updating the collaborative project. It is further noted that although FIG. 1 shows remote users 150a and 150b working collaborative through use of collaborative project management system 102, in practice many additional remote users may be in collaboration with remote users 150a and 150b. For example, user database 108 may include identification and data routing information for all remote users authorized to collaborate on a project.

In addition, in some implementations, hardware processor 104 may be configured to execute collaboration module 120 to selectively utilize visual effects application 124 and multi-user collaborator application 126 despite those applications being non-interactive. That is to say, in some implementations, visual effects application 124 and multi-user collaborator application 126 may not be configured to exchange data or to work cooperatively. Moreover, in some implementations, visual effects application 124 and multi-user collaborator application 126 may be incompatible. In those latter implementations, hardware processor 104 may be configured to execute collaboration module 120 to utilize visual effects application 124 and multi-user collaborator application 126 independently of one another, such as by selectively transferring control over master project application 122 between visual effects application 124 and multi-user collaborator application 126.

Figure 2:
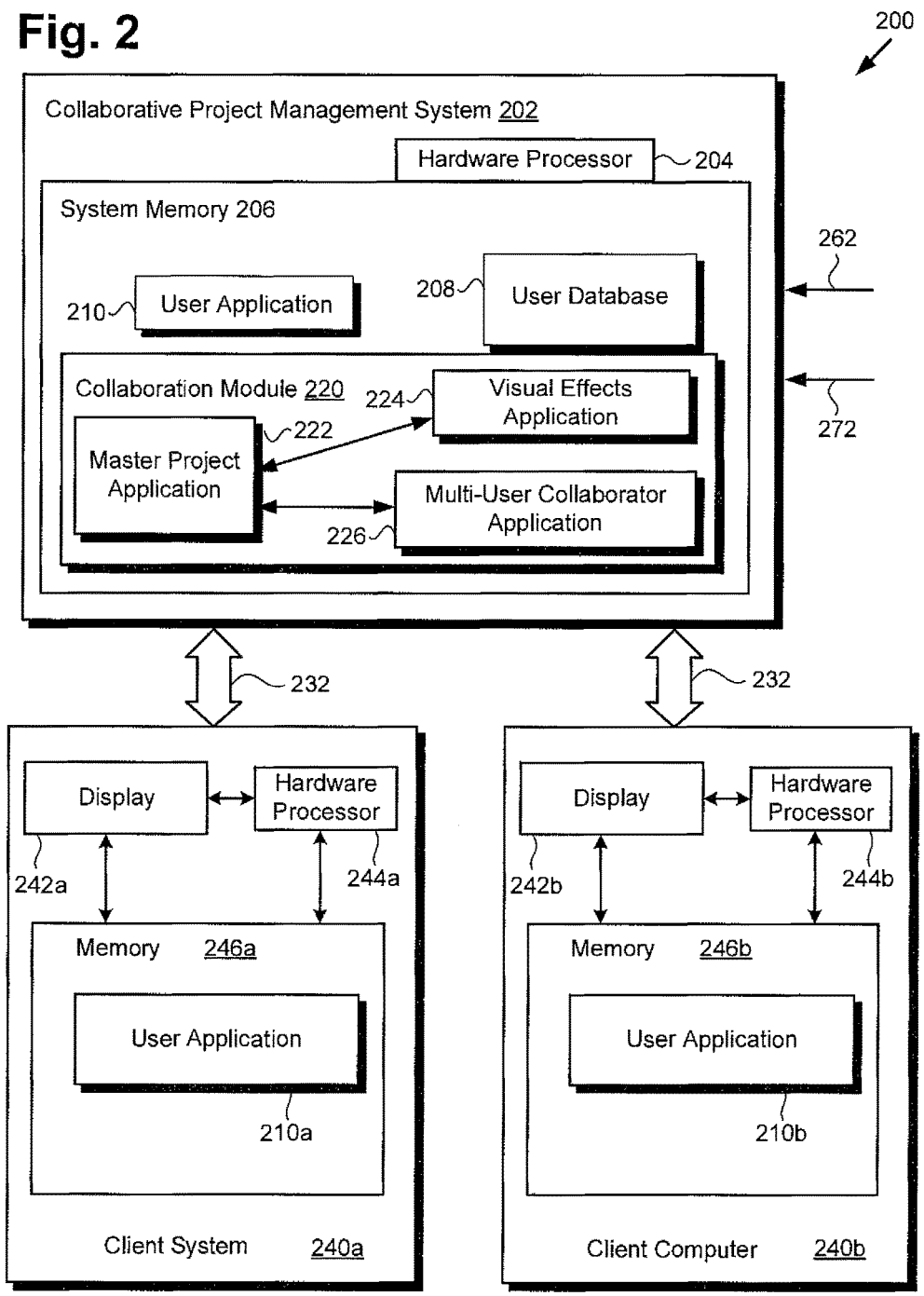
FIG. 2 shows another implementation of an exemplary collaborative project management system.

Referring to FIG. 2, FIG. 2 shows another exemplary implementation of a collaborative project management system as collaborative project management system 202. In addition to collaborative project management system 202, collaboration environment 200 in FIG. 2 includes client systems 240a and 240b interactively connected to collaborative project management system 202 over network communication links 232. Also shown in FIG. 2 are project data 262 and project data 272 received by collaborative project management system 202.

As shown in FIG. 2, collaborative project management system 202 includes hardware processor 204, and system memory 206 storing collaboration module 220 including master project application 222, visual effects application 224, and multi-user collaborator application 226. In addition, system memory 206 is shown to include user database 208 and user application 210. As further shown in FIG. 2, client system 240a includes display 242a, hardware processor 244a, and memory 246a storing user application 210a, while client system 240b includes display 242b, hardware processor 244b, and memory 246b storing user application 210.

Network communication links 232, project data 262 and 272, and collaborative project management system 202 including hardware processor 204 and system memory 206 correspond in general to network communication links 132, project data 162 and 172, and collaborative project management system 102 including hardware processor 104 and system memory 106, in FIG. 1. In addition, collaboration module 220 including master project application 222, visual effects application 224, and multi-user collaborator application 226, in FIG. 2, corresponds in general to collaboration module 120 including master project application 122, visual effects application 124, and multi-user collaborator application 126, in FIG. 1. In other words, collaboration module 220, master project application 222, visual effects application 224, and multi-user collaborator application 226 may share any of the characteristics attributed to corresponding collaboration module 120, master project application 122, visual effects application 124, and multi-user collaborator application 126 shown in FIG. 1 and described above.

Client systems 240a and 240b correspond in general to client systems 140a and 140b, respectively, in FIG. 1. Moreover, user application 210/210a/210b, as well as user database 208, in FIG. 2, correspond respectively in general to user application 110 and user database 108, in FIG. 1. As a result, user application 210/210a/210b and user database 208 may share any of the characteristics attributed to corresponding user application 110 and user database 108 in the present application.

According to the exemplary implementation shown in FIG. 2, user application 210a is located in memory 246a of client system 240a and user application 210b is located in memory 246b of client system 240b, user applications 210a and 210b having been received from collaborative project management system 202 via network communication links 232. In one implementation, network communication links 232 corresponds to transfer of user applications 210a and 210b over a packet network, for example. Once transferred, for instance by being downloaded over network communication links 232, user applications 210a and 210b may be persistently stored in respective memories 246a and 246b, and may be executed locally on respective client system 240a and 240b by respective hardware processors 244a and 244b.

Hardware processors 244a and 244b may be the central processing units (CPUs) for respective client systems 240a and 240b, for example, in which role hardware processors 244a and 244b run the respective operating systems for client systems 240a and 240b, and execute respective user applications 210a and 210b. Displays 242a and 242b may take the form of liquid crystal displays (LCDs), light-emitting diode (LED) displays, organic light-emitting diode (OLED) displays, or any suitable display screens that perform a physical transformation of signals to light.

In the exemplary implementation represented in FIG. 2, remote users of client systems 240a and 240b, such as respective remote users 150a and 150b, in FIG. 1, can utilize respective user applications 210a and 210b to send change data to collaborative project management system 202 and/or to receive master change data from collaborative project management system 202, via network communication links 232. In addition, the remote users of client systems 240a and 240b can view modifications to the collaborative project corresponding to master project application 222 residing in system memory 206 of collaborative project management system 202, remotely from collaborative project management system 202, on respective displays 242a and 242b. That is to say, the visual effect or effects produced by visual effects application 226 and representative of updates to the collaborative project may be displayed to the remote users on displays 242a and 242b of respective client systems 240a and 240b.

Moving now to FIG. 3, collaborative project management system 102/202 in respective FIG. 1/2, will be further described with reference to flowchart 380, which outlines an exemplary method for use by a collaborative project management system.

Flowchart 380 begins with processing change data corresponding to an update to a collaborative project common to remote users 150a and 150b (action 381). The change data may be processed by collaboration module 120/220 of collaborative project management system 102/202, executed by respective hardware processor 104/204. As noted above, such change data may be received over network communication links 132/232 based on updates to the collaborative project introduced by remote users 150a and/or 150b, for example. Alternatively, or in addition, such change data may be generated automatically by collaboration module 120/220 based on project data 162/262 and/or project data 172/272 received from respective first and second project data sources 160 and 170.

By way of example, where collaborative project management system 102/202 is used to produce a TV broadcast schedule that is substantially optimized to enhance ratings and/or to increase advertising sponsorship, master project application 122/222 may include one or more lists prioritized according to viewer popularity. In that implementation, project data 162 and/or 172 may be received from respective first and second project data sources 160 and 170 in the form of data provided by a third party aggregator of TV metrics, such as Nielsen™, for example, that is not an active participant in the collaborative project. In other words first project data source 160 and second project data source 170 provide project data 162 and 172 to collaborative project management system 102/202, but are non-users of collaborative project management system 102/202. Based on receipt of such TV metrics data as project data 162 and/or 172 from respective first and second project data sources 160 and 170, collaboration module 120/220 may be configured to generate a change data for updating the collaborative project through a reordering of the prioritized list or lists, and may be configured to do so automatically.

Alternatively, or in addition, change data may be received from one or both of user applications 210a and 210b due to contributions to the collaborative project by respective remote users 150a and 150b. For example, remote user 150a and/or 150b may generate change data for adding a feature or features to, deleting a feature or features from, or modifying a feature or features of the collaborative project corresponding to master project application 122/222, using respective user applications 220a and 220b.

Flowchart 380 continues with assigning control of master project application 122/222 to visual effects application 124/224 (action 382). Control of master project application 122/222 may be assigned to visual effects application 124/224 by collaboration module 120/220, executed by hardware processor 104/204. As noted above, visual effects application 124/224 is temporarily assigned control of master project application 122/222. That temporary control enables visual effects application 124/224 to implement the update to master project application 122/222 corresponding to the change data processed in action 381.

Flowchart 380 continues with transforming the change data into a visual effect (action 383). Transformation of the change data into a visual effect can be performed by collaboration module 120/220, executed by hardware processor 104/204, and using visual effects application 124/224. The visual effect produced using visual effects application 124/224 is representative of the update to the collaborative project. In some implementations, the visual effect may be a dynamic visual effect, such as an animation representative of the update, for example.

As a specific example, and continuing with the exemplary TV scheduling use case scenario introduced above, introduction of a new TV program to the collaborative schedule may be represented by a visual effect in the form of an animated lightning strike drawing attention to the new program. Alternatively, a visual effect representative of new programming my appear as a stork flying into a display pane showing the existing TV schedule and placing an icon representing the new program onto the TV schedule. As another example, a visual effect representative of a change in scheduling of an existing TV program might show the icon for the TV program appearing to grow legs and to walk or run across an image of the TV schedule from its former scheduling slot to its new scheduling slot.

Flowchart 380 continues with producing a modification to master project application 122/222 based on the visual effect (action 384). Master project application may be modified by collaboration module 120/220, executed by hardware processor 104/204, and using visual effects application 124/224. For example, master project application 122/222 may be modified using visual effects application 124/224 to include the visual effect produced using visual effects application 124/224 through transformation of the change data in action 383.

Flowchart 380 continues with transferring control of master project application 122/222 to multi-user collaborator application 126/226 (action 385). Control of master project application 122/222 may be transferred to multi-user collaborator application 126/226 by collaboration module 120/220, executed by hardware processor 104/204.

As noted above, in some implementations, hardware processor 104/204 may be configured to execute respective collaboration module 120/220 to selectively utilize visual effects application 124/224 and multi-user collaborator application 126/226 despite those applications being non-interactive. For example, visual effects application 124/224 and multi-user collaborator application 126/226 may not be configured to exchange data or to work cooperatively. Moreover, and as further noted above, in some implementations, visual effects application 124/224 and multi-user collaborator application 126/226 may be incompatible. Consequently, hardware processor 104/204 may be configured to execute respective collaboration module 120/220 to utilize visual effects application 124/224 and multi-user collaborator application 126/226 independently of one another, such as by preventing master project application 122/222 from interacting with visual effects application 124/224 and multi-user collaborator application 126/226 concurrently.

Flowchart 380 may conclude with providing a master change data for updating user applications 210a and 210b utilized by respective remote users 150a and 150b to participate in the collaborative project, based on the modification to master project application 122/222 (action 386). The master change data may be provided by collaboration module 120/220, executed by hardware processor 104/204, and using multi-user collaborator application 126/226.

The master change data can be provided to user applications 210a and 210b on respective client systems 140a/240a and 140b/240b over network communication links 132/232. In addition, the master change data may be provided to all remote users identified in user database 108/208 as being authorized to collaborate on the collaborative project. In some implementations, the master change data provided to user applications 210a and 210b may be provided to client systems 140a/240a, 140b/240b and all remote authorized remote users identified in user database 108/208 substantially concurrently. Moreover, in some implementations, the master change data may be provided to user applications 210a, 210b, and all other user applications utilized by remote users identified in user database 108/208 as being authorized to collaborate on the collaborative project substantially in real-time relative to generation of the change data for updating the collaborative project.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A collaborative project management system comprising:
   a hardware processor;
   a system memory having stored therein a collaboration module including a master project application corresponding to a collaborative project, the collaboration module further including a visual effects application and a multi-user collaborator application, wherein the visual effects application and the multi-user collaborator application are non-interactive and are unable to both concurrently control the master project application;
   wherein the hardware processor is configured to execute the collaboration module to:
      process a change data corresponding to an update to the collaborative project which is common to a plurality of remote users;
      assign temporary control of the master project application to the visual effects application, such that the multi-user collaborator application is prevented from concurrently controlling the master project application;
      transform, after the assigning and using the visual effects application, the change data into a visual effect;
      produce, after the transforming and using the visual effects application, a modification to the master project application based on the visual effect;
      transfer, after the producing, control of the master project application to the multi-user collaborator application, such that the visual effects application is prevented from concurrently controlling the master project application; and
      provide, after the transferring and using the multi-user collaborator application, a master change data for updating a plurality of user applications utilized by the plurality of remote users to participate in the collaborative project, based on the modification.

2. The collaborative project management system of claim 1, wherein the change data is received from one of the plurality of user applications.

3. The collaborative project management system of claim 1, wherein the change data is generated automatically by the collaborative project management system.

4. The collaborative project management system of claim 3, wherein the change data is generated automatically based on a project data received from a third party non-user project data source.

5. The collaborative project management system of claim 1, wherein the visual effect comprises a dynamic visual effect representative of the update.

6. The collaborative project management system of claim 5, wherein the visual effect comprises an animation.

7. The collaborative project management system of claim 1, wherein the master change data for updating the plurality of user applications is provided to the plurality of user applications concurrently.

8. The collaborative project management system of claim 1, wherein the master change data for updating the plurality of user applications is provided in real-time.

9. A method for use by a collaborative project management system including a hardware processor and a system memory having a collaboration module stored therein, the method comprising:
    processing, using the hardware processor, a change data corresponding to an update to a collaborative project which is common to a plurality of remote users;
    assigning, using the hardware processor, temporary control of a master project application corresponding to the collaborative project to a visual effects application of the collaboration module, such that a multi-user collaborator application is prevented from concurrently controlling the master project application;
    transforming, after the assigning and using the hardware processor to execute the visual effects application, the change data into a visual effect;
    producing, after the transforming and using the hardware processor to execute the visual effects application, a modification to the master project application based on the visual effect;
    transferring, after the producing and using the hardware processor, control of the master project application to the multi-user collaborator application of the collaboration module, such that the visual effects application is prevented from concurrently controlling the master project application; and
    providing, after the transferring and using the hardware processor to execute the multi-user collaborator application, a master change data for updating a plurality of user applications utilized by the plurality of remote users to participate in the collaborative project, based on the modification;
    wherein the visual effects application and the multi-user collaborator application are non-interactive and are unable to both concurrently control the master project application.

10. The method of claim 9, wherein the change data is received from one of the plurality of user applications.

11. The method of claim 9, wherein the change data is generated automatically by the collaborative project management system.

12. The method of claim 11, wherein the change data is generated automatically based on a project data received from a third party non-user project data source.

13. The method of claim 9, wherein the visual effect comprises a dynamic visual effect representative of the update.

14. The method of claim 13, wherein the visual effect comprises an animation.

15. The method of claim 9, wherein the master change data for updating the plurality of user applications is provided to the plurality of user applications concurrently.

16. The method of claim 9, wherein the master change data for updating the plurality of user applications is provided in real-time.

* * * * *